United States Patent [19]
Ludwig

[11] Patent Number: 5,441,224
[45] Date of Patent: Aug. 15, 1995

[54] RETAINER AND METHOD FOR ATTACHING WIRING TO OBJECTS

[76] Inventor: Douglas P. Ludwig, 560 South St., Glendale, Calif. 91202

[21] Appl. No.: 283,631

[22] Filed: Aug. 1, 1994

[51] Int. Cl.⁶ ............................................. F16L 3/08
[52] U.S. Cl. .................................. 248/74.2; 248/74.5
[58] Field of Search ............... 248/74.1, 68.1, 74.2, 248/71, 74.5; 24/459; 74/135

[56] References Cited

U.S. PATENT DOCUMENTS

| | | |
|---|---|---|
| D. 204,884 | 5/1966 | Waddington . |
| 551,032 | 12/1895 | Hemphill . |
| 753,399 | 3/1904 | Hunt . |
| 3,124,327 | 3/1964 | Maszaros ............................ 248/74.2 |
| 3,193,229 | 7/1965 | Stock . |
| 3,228,640 | 1/1966 | Wolsh ............................ 248/74.2 X |
| 3,275,818 | 9/1966 | Campbell . |
| 3,438,604 | 4/1969 | Spicer . |
| 3,498,575 | 3/1970 | Downing ........................ 248/74.1 X |
| 3,529,796 | 9/1970 | MacDonald .......................... 248/71 |
| 3,540,687 | 11/1970 | Cuva . |
| 3,883,926 | 5/1975 | Reynolds ........................... 248/74.1 |
| 4,025,015 | 5/1977 | Kolic . |
| 4,163,372 | 8/1979 | Frye ................................ 248/68.1 X |
| 4,714,219 | 12/1987 | Mayse . |
| 4,823,752 | 4/1989 | Uuskallio ........................ 248/74.1 X |
| 4,834,707 | 7/1989 | Lake .............................. 248/74.2 X |
| 4,852,832 | 8/1989 | Delaney . |
| 4,962,907 | 10/1990 | Gary . |
| 5,110,078 | 5/1992 | Gary . |

FOREIGN PATENT DOCUMENTS 2572488 10/1984 France ............................ 248/74.5

*Primary Examiner*—J. Franklin Foss
*Attorney, Agent, or Firm*—Timothy T. Tyson; Ted Masters; Freilich, Hornbaker & Rosen

[57] ABSTRACT

A retainer (20) for attaching wiring (100), such as a continuous strand of decorative Christmas lights, to objects such as facia, rain gutters, eaves, walls, ceilings, and windows is disclosed. The retainer (20) has a receiving means (34) for accepting and holding the wiring (100). The retainer (20) can be attached to the object by the use of an adhesive (42), by the use of a fastener (358), or a combination of the two.

8 Claims, 4 Drawing Sheets

FIG. 1
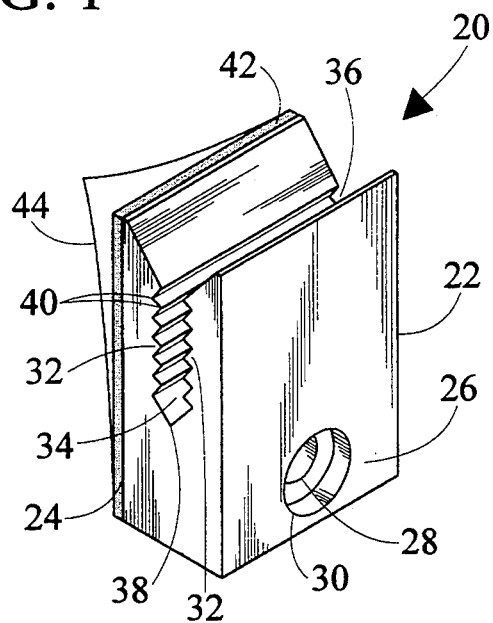
FIG. 2
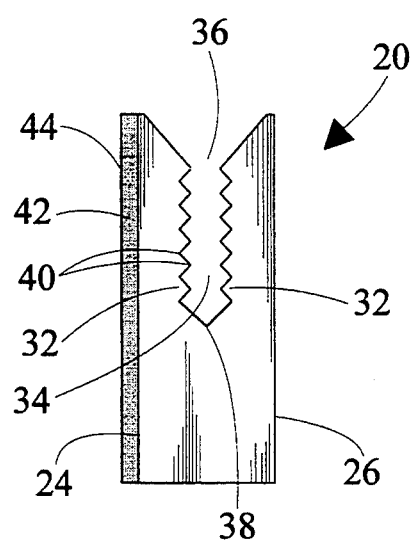
FIG. 3
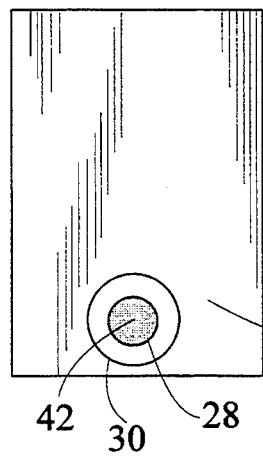
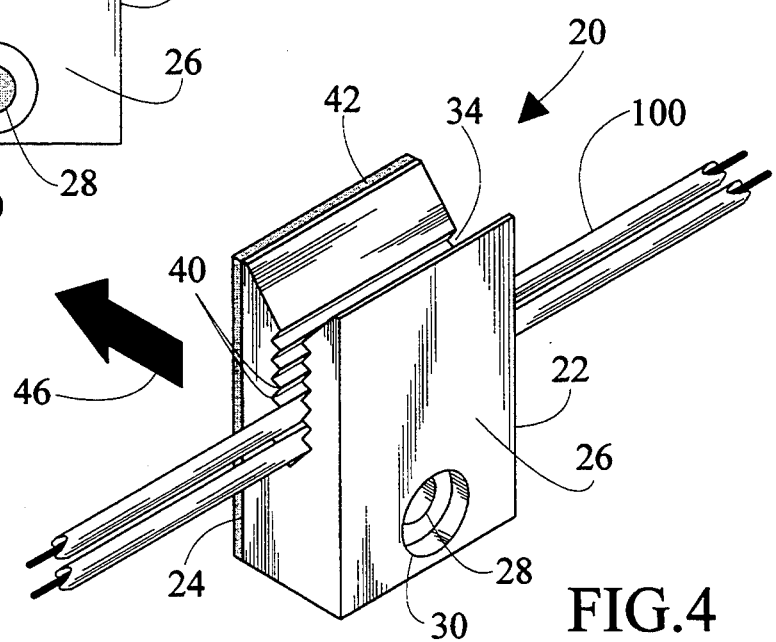
FIG. 4

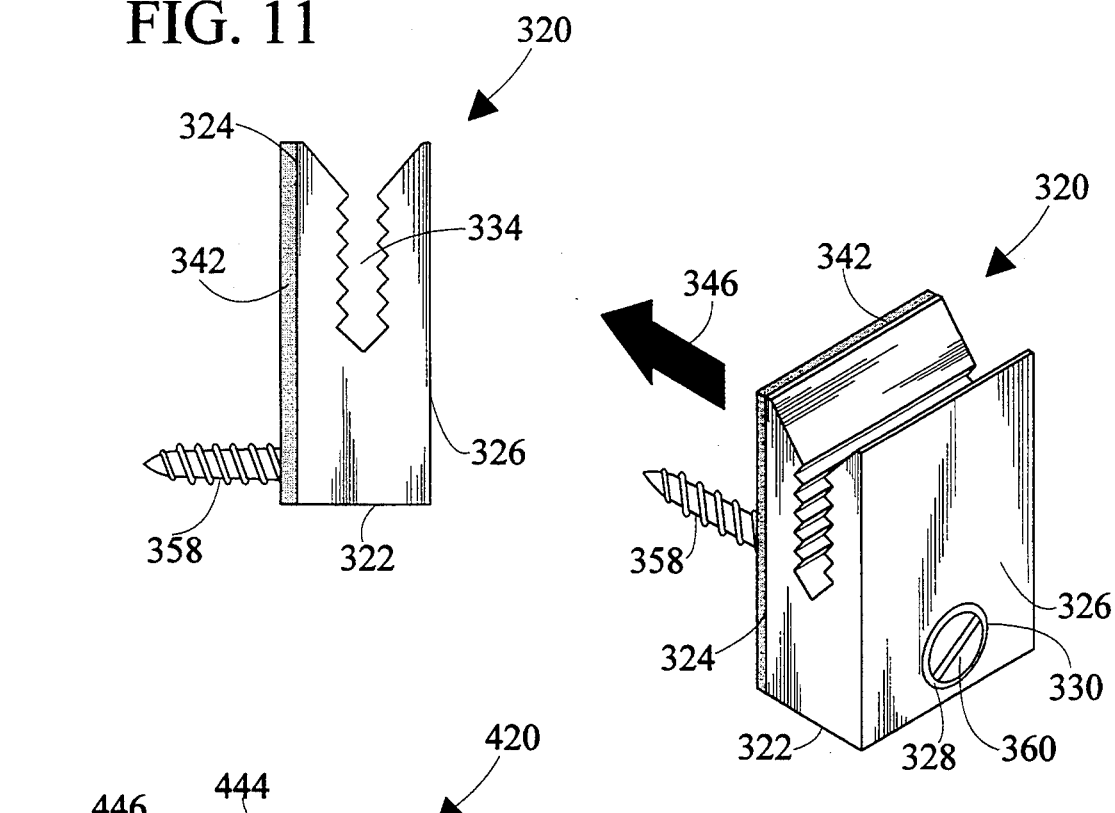
FIG. 11
FIG. 12
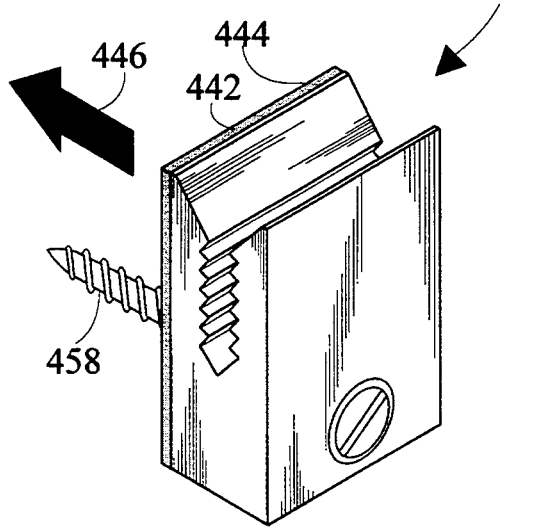
FIG. 13
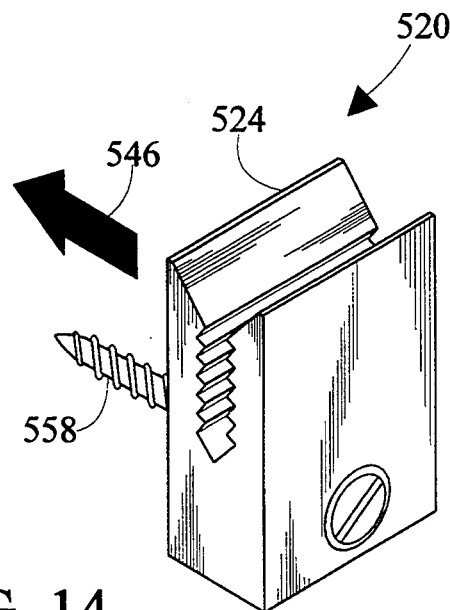
FIG. 14

RETAINER AND METHOD FOR ATTACHING WIRING TO OBJECTS

TECHNICAL FIELD

The present invention pertains to retainers and a method for attaching wiring, such as a continuous strand of decorative Christmas lights, to objects such as facia, rain gutters, eaves, walls, ceilings, windows and similar supporting structures.

BACKGROUND ART

Devices for attaching a continuous strand of conductive wiring have been known in the art for many years. Each of these devices utilizes a series of holders which are connected to the desired supporting structure at periodic intervals and grasp or otherwise secure the wiring in place. The holders are typically attached to the supporting structure either with a fastener such as a threaded screw, or with an adhesive. For example, U.S. Pat. Des. No. 204,884 shows a mounting bracket for electrical conductors. The bracket has a wire receiving slot and a wire receiving cavity. U.S. Pat. No. 551,032 defines a cleat for electric wiring having tapered recesses that can hold wires of different diameters. U.S. Pat. No. 753,399 depicts a combination insulating bracket and knob for electric conductors wherein the conductor can be attached to the bracket and knob in several ways. U.S. Pat. No. 3,193,229 discloses a hanger for a string of lights. The hanger comprises a resilient plastic clip which fastens the string to the rain gutter of a home. U.S. Pat. No. 3,275,818 constitutes a modular display means for mounting a string of electric lights in a window, door jamb or on a flat surface. U.S. Pat. No. 3,438,604 describes a retainer clip for temporary wiring. The clip can be used to attach electrical wiring to facia, rain gutters and similar structures. U.S. Pat. No. 3,540,687 shows a light socket retainer for securing a continuous strand of lights to a house or other structure. The retainer can be attached to the structure with either fasteners or adhesives. U.S. Pat. No. 4,025,015 defines a detachable article-mounting device for mounting articles to relatively fixed surfaces. The device is attached with a self-sticking adhesive layer having a peel-off sheet. U.S. Pat. No. 4,714,219 depicts Christmas light hangers that employ a slidable sleeve to secure the light string in place. U.S. Pat. No. 4,852,832 discloses a decorative light holder for retaining separate lights and intermediate wiring along straight and curvilinear paths. Adhesive means is used to permit easy attachment to walls or other structures. U.S. Pat. No. 4,962,907 constitutes a decorative light holder for light and bulb assemblies having an adhesive pad adapted to secure the holder to a substantially planar underlying support surface. U.S. Pat. No. 5,110,078 describes a decorative light support assembly which is attached to the supporting structure by a suction cup.

DISCLOSURE OF INVENTION

The present invention is directed to an improved retainer and method for attaching wiring to an object. The present invention affords the user several options for connecting the retainer to the wiring, and also permits attachment to the object by the use of a fastener, an adhesive, or a combination of the two.

In accordance with a preferred embodiment of the invention, the retainer has a body having an exterior surface. The exterior surface has a first substantially planar side with adhesive disposed thereon. The retainer is attached to the object by pressing the first planar side against the object. A first hole, which can be used for fastener mounting, is oriented substantially perpendicular to the first planar side, the first hole passing through the body and the first planar side. In this embodiment a fastener is not employed, and the retainer is attached to the object by the adhesive.

In accordance with a preferred embodiment of the invention, the retainer has a receiving means integral with the body, the receiving means is adapted to longitudinally accept the wiring.

In accordance with an important aspect of the invention, the receiving means includes walls defining a slot having an outward open end and an inward end. The walls of the slot have either longitudinal or traverse serrations to better grip the wiring.

In accordance with an important aspect of the invention, the body of the retainer is produced from resilient material adapted to urge the walls of the slot together. The walls are manually spread to allow insertion of the wiring. Then the walls are released and return to their normal positions firmly securing the wiring therebetween.

In accordance with another important aspect of the invention, the body includes a second hole forming a longitudinal cavity for receiving the wiring. The second hole is substantially perpendicular to the first hole and is connected to the inward end of the slot. The wiring is inserted into the manually spread walls of the slot and comes to rest in the longitudinal cavity.

In accordance with another preferred embodiment of the invention, the exterior surface includes a second substantially planar side opposite to and substantially parallel to the first planar side. The first hole also passes through the second planar side. A fastener, such as a threaded screw or the like, is inserted into the first hole in the second planar side, passed through the body until the head of the fastener abuts the second planer side. The fastener is then connected to the object, and firmly holds the retainer in place. In this embodiment the retainer is attached to the object by both the adhesive and the fastener.

In accordance with an important aspect of the invention, the adhesive has a protective peel-off covering, which is removed just prior to pressing the first planar side against the object.

In accordance with another important aspect of the invention, the retainer is attached to the object by the fastener without removing the protective peel-off covering. In this manner, the retainer is attached only by the fastener and not by the adhesive.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a front perspective view of the retainer in accordance with the present invention;

FIG. 2 is a left end elevation view of the retainer;

FIG. 3 a front view of the retainer;

FIG. 4 is a front perspective view of the retainer with wiring installed;

FIG. 11 is a left end elevation view of a fourth embodiment;

FIG. 12 is a front perspective view of the fourth embodiment;

FIG. 13 is a front perspective view of a fifth embodiment;

FIG. 14 is a front perspective view of a sixth embodiment;

MODES FOR CARRYING OUT THE INVENTION

Figures 5, 6, 7:
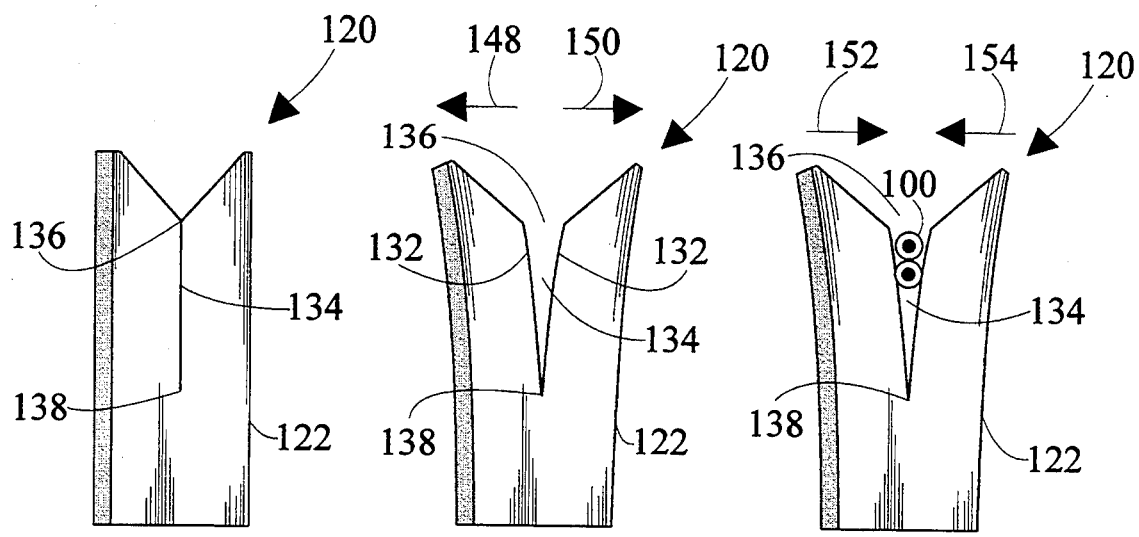
FIG. 5 is a left end elevation view of a second embodiment.
FIG. 6 is a left end elevation view of the second embodiment with the walls separated.
FIG. 7 is a left end elevation view of the second embodiment with the wiring installed.

Referring initially to FIGS. 1, 2, and 3, a retainer for attaching wiring to objects is illustrated in perspective, left end elevation, and front views respectively, in accordance with the present invention, generally designated as 20. The retainer 20 has a body 22 having an exterior surface with a first substantially planar side 24, and a second substantially planar side 26 opposite to and substantially parallel to the first planar side 24. A first hole 28 is oriented substantially perpendicular to the first planar side 24 and second planar side 26. The first hole 28 passes through the body 22, the first planar side 24, and the second planar side 26. The first hole 28 has a countersunk or counterbored portion 30 suitable for accepting a fastener 358, shown in FIGS. 11 and 12. Receiving means are integral with the body 22, and are adapted to longitudinally accept the wiring 100, shown in FIG. 4. In the embodiment shown, the receiving means comprises substantially parallel walls 32 defining a slot 34. The slot 34 has an outward open end 36, and an inward end 38. The width of the slot 34 can be adjusted to accommodate wiring 100 of various diameters. Serrations 40 are disposed on the walls 32 of the slot 34. In the figure the serrations 40 are oriented longitudinally along the length of the wiring 100, however they can also be oriented traversely so as to be perpendicular to the wiring 100.

Adhesive 42 is disposed on the first planar side 24. In the embodiment shown, the adhesive consists of double-faced tape which is secured to the first planar side 24. Scotch TM Brand 4949 Double Coated Acrylic Foam Tape, 45 mil thickness, sold by 3M of St. Paul, Minn. 55133, or other similar products can be used. However, other adhesives such as contact cement could also be used. The adhesive 42 is provided with a protective peel-off covering 44 which is removed just prior to pressing the first planar side 24 against the object to secure the retainer 20 in place.

FIG. 4 is a perspective view of the retainer 20 with the wiring 100 installed. In the embodiment shown, the wiring 100 has been inserted into the slot 34, the serrations 40 serve to hold the wiring 100 in place within the retainer 20. To attach the retainer 20, the first planar side 24 and the disposed adhesive 42 are firmly pressed against an object such as facia, a rain gutter, eaves or the like in direction 46 and then the wiring 100 is inserted. The wiring 100 may also be installed in the retainer 20 before the retainer 20 is pressed against the object. This adhesive 42 attaching embodiment is ideal in instances where the object has a smooth surface profile, and is particularly useful for mounting the retainer 20 to a glass surface such as a window.

FIGS. 5, 6, and 7 are left end elevation views of a second embodiment of the retainer, generally designated as 120. The body 122 of the retainer 120 is produced from a resilient material such as plastic, which when deformed and released, will return to its original shape. Polyethylene, polypropylene, polyvinyl chloride, and polystyrene are useful resilient materials having tensile modulus of elasticity ranging from 1000 to 35000; from 11,000 to 16,000; from 3600 to 43,000; and from 10,000 to 43,000 kilograms per square centemeter, respectively. Other plastics having similar elasticity would also be useful. The plastic needs to be resilient enough to allow a wire to enter and the sides of the retainer to close behind. Two walls 132 define a slot 134 having an outward open end 136 and an inward end 138. In FIG. 6 the walls 132 are manually separated in directions 148 and 150 to allow insertion of the wiring 100 into the outward open end 136 of the slot 134. In FIG. 7 the wiring 100 is inserted, then the walls 132 are released and move toward their normal positions in directions 152 and 154 firmly securing the wiring 100 therebetween.

Figures 8, 9, 10:
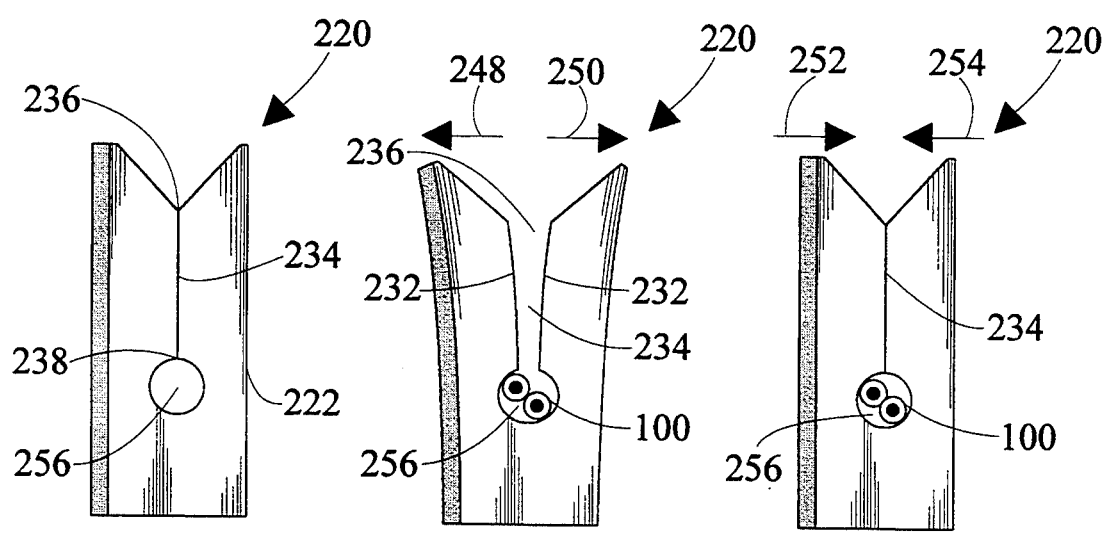
FIG. 8 is a left end elevation view of a third embodiment showing a wiring receiving hole forming a longitudinal cavity.
FIG. 9 is a left end elevation view of the third embodiment with the walls separated and the wiring resting in the longitudinal cavity.
FIG. 10 is a left end elevation view of the third embodiment showing the wiring captured within the cavity.

FIGS. 8, 9, and 10 are left end elevation views of a third embodiment of the retainer, generally designated as 220. The body 222 of the retainer 220 is produced from a resilient material such as plastic, which when deformed and released, will return to its original shape. Two walls 232 define a slot 234 having an outward open end 236 and an inward end 238. A hole forming a longitudinal cavity 256 for receiving the wiring 100 is connected to the inward end 238 of the slot 234. In FIG. 9 the walls 232 are manually separated in directions 248 and 250 to allow insertion of the wiring 100 into the outward open end 236 of the slot 234. The wiring 100 is inserted and rests in the cavity 256. In FIG. 10 the walls 232 are released and resiliently return to their normal positions in directions 252 and 254 capturing the wiring 100 within the cavity 256.

FIGS. 11 and 12 are left end elevation and perspective views of a fourth embodiment of the retainer, generally designated as 320. The retainer 320 has a body 322, a wiring receiving slot 334, an adhesive 342 disposed on a first substantially planar side 324, and a second substantially planar side 326. The other features of the body 322 are the same as the body 22 shown in FIGS. 1–4. A first hole 328 as better shown in FIGS. 1, 3 and 4 as first hole 28 is oriented substantially perpendicular to the first planar side 324 and the second substantially planar side 326, the first hole 328 passing through the body 322 and the planar sides 324 and 326. The first hole 328 has a countersunk or counterbored portion 330 also as better shown in FIGS. 1, 3 and 4 as counterbored portion 30. As before, the retainer 320 is then attached to the object by firmly pressing the first planar side 324 and the disposed adhesive 342 against an object such as facia, a rain gutter, eaves or the like in direction 346 and then inserting the wiring 100 (FIG. 4)

into the receiving slot 334. A fastener 358, such as a threaded screw or the like, having a head 360, is then inserted into the first hole 328 in the second planar side, passed through the body 322 until the head 360 of the fastener 358 abuts the countersunk or counterbored portion 330 of the second planer side 326. To accomplish this the fastener 358 is rotated during the insertion process so as to penetrate the adhesive 342. The fastener 358 is then connected to the object, and firmly holds the retainer 320 in place. In this embodiment the retainer 320 is attached to the object by both the adhesive 342 and the fastener 358 and is therefore much more securely attached to the object.

FIG. 13 is a perspective view of a fifth embodiment of the retainer, generally designated 420. This embodiment is the same as the embodiment shown in FIGS. 11 and 12 with the single exception that a protective peel-off covering 444 is disposed on the adhesive 442. Therefore, when the retainer 420 is pressed against the object in direction 446, the adhesive 442 does not come into contact with the object, and the only means of attachment is through the fastener 458. This embodiment is employed when the surface profile of the object is not amenable to an adhesive 442, such as might be the case with a stucco wall. Alternatively, this embodiment is desirable when the adhesive may leave an unwanted residue, or perhaps could damage the object's surface upon removal. In fact, the adhesive 442 and unremoved protective covering 444, form a cushioned pad which serves to protect the surface of the object.

FIG. 14 is a perspective view of a sixth embodiment of the retainer, generally designated 520, which is similar to the fifth embodiment of FIG. 13. In this embodiment the retainer 520 does not have an adhesive disposed on first planar side 524, and is only connected to the object by a fastener 558 in direction 546.

FIGS. 1, 5, 8, 11, 13, and 14 represent specific embodiments of the present invention. However, it is appreciated that the features of one embodiment can be readily employed in other embodiments in ways disclosed but not specifically described herein.

Figure 15:
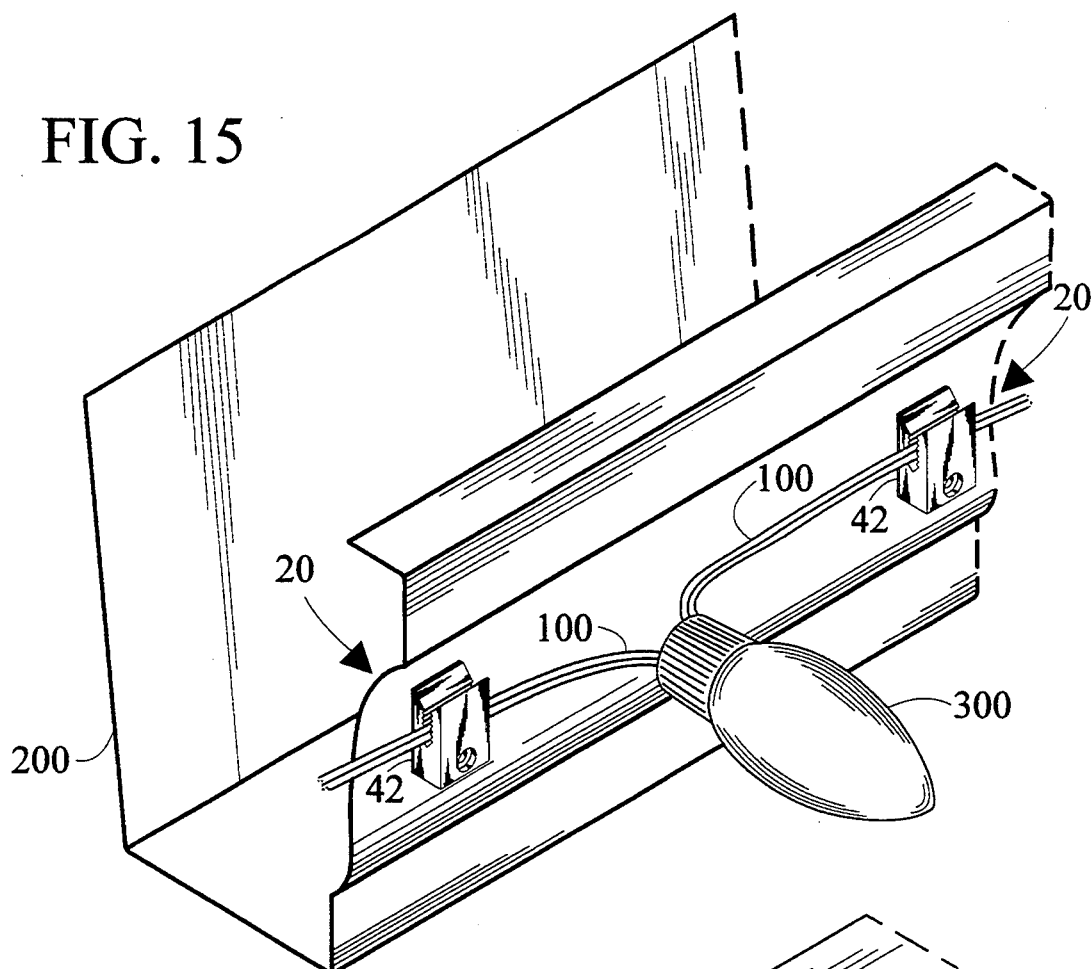
FIG. 15 is a reduced perspective view of two retainers attached to a rain gutter; and, FIG. 16 is a reduced perspective view of two retainers attached to a facia board.

FIG. 15 is a reduced perspective view of two retainers 20 attached to an object such as a rain gutter 200. The retainers 20 hold wiring 100 and a decorative light 300 firmly in place. The retainers 20 are connected to the rain gutter by adhesive 42. It is noted that the retainers 20 may be attached at any desired interval along the rain gutter 200. Additionally, the retainers 20 may be colored to better blend with the existing decor.

Figure 16:
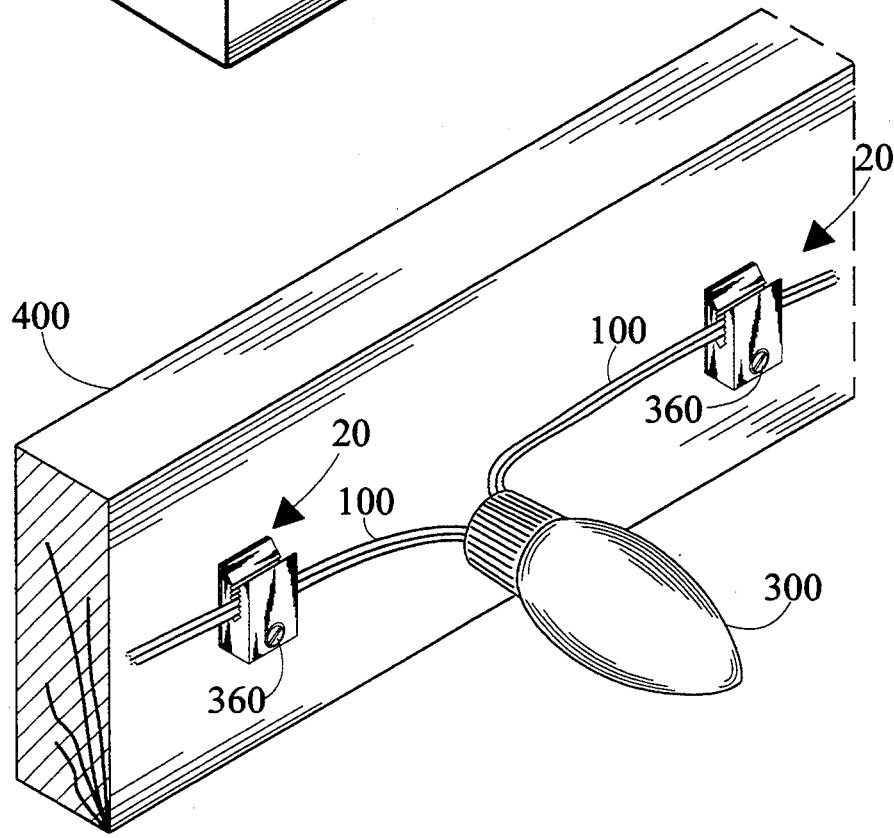

FIG. 16 is a reduced perspective view of two retainers 20 attached to an object such as a facia board 400. The retainers 20 hold wiring 100 and a decorative light 300 firmly in place. The retainers 20 are connected to the facia board 400 by fasteners having heads 360. However, the retainers could also be connected by adhesive, as in FIG. 15, or by a combination of the two.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A retainer for attaching wiring to an object, comprising:
    a body having an exterior surface, said exterior surface having a first substantially planar side; said body having a first hole oriented substantially perpendicular to said first planar side, said first hole passing through said body and said first planar side;
    receiving means integral with said body, said receiving means adapted to longitudinally accept the wiring, said receiving means including substantially parallel walls defining a slot, said slot having an outward open end and an inward end; and,
    adhesive disposed on said first planar side.

2. A retainer according to claim 1, wherein said walls of said slot have serrations disposed thereon.

3. A retainer according to claim 1, said exterior surface further including a second substantially planar side opposite to and substantially parallel to said first planar side, said first hole also passing through said second planar side, said retainer further including a fastener having a head, said fastener inserted into said first hole in said second planar side and passing through said body until said head abuts said second planar side.

4. A retainer according to claim 1, further including a protective peel-off covering disposed on said adhesive.

5. A retainer according to claim 4, said exterior surface further including a second substantially planar side opposite to and substantially parallel to said first planar side, said first hole also passing through said second planar side, said retainer further including a fastener having a head, said fastener inserted into said first hole in said second planar side and passing through said body until said head abuts said second planar side.

6. A method for attaching wiring to an object, comprising the steps of:
    providing a retainer having a body, a first substantially planar side, a first hole passing through said body and said first planar side, a receiving means having substantially parallel walls defining a slot, and adhesive disposed on said first planar side;
    pressing said adhesive against the object; and,
    inserting the wiring into said slot.

7. A method according to claim 6, wherein said step of providing further comprises providing said retainer with a second substantially planar side opposite to and substantially parallel to said first planar side, said first hole oriented substantially perpendicular to and passing through said first and second planar sides, and a fastener having a head;
    further comprising the steps of;
    inserting said fastener into said first hole in said second planar side;
    passing said fastener through said body until said head abuts said second planar side; and,
    connecting said fastener to the object.

8. A method for attaching wiring to an object, comprising the steps of:
    providing a retainer, said retainer having a body, a first substantially planar side, a second substantially planar side opposite to said first planar side, a first hole oriented substantially perpendicular to and passing through said first and second planar sides, adhesive disposed on said first planar side, a protective peel-off covering disposed on said adhesive, a receiving means, and a fastener having a head;
    pressing said protective peel-off covering against the object;
    inserting said fastener into said first hole in said second planar side;
    passing said fastener through said body until said head abuts said second planar side;
    connecting said fastener to the object; and;
    inserting the wiring into said receiving means.

* * * * *